United States Patent [19]

Rawls

[11] 4,088,998
[45] May 9, 1978

[54] SYSTEM FOR DETECTING NUCLEAR EXPLOSIONS

[75] Inventor: Lucien E. Rawls, Leesburg, Va.

[73] Assignee: Westinghouse Electric Corp., Pittsburgh, Pa.

[21] Appl. No.: 77,636

[22] Filed: Dec. 22, 1960

[51] Int. Cl.² .................... G01S 5/06; H04B 13/02; H01Q 1/04

[52] U.S. Cl. .................................. 343/112 R; 325/28; 343/100 R; 343/719

[58] Field of Search ................. 343/100, 112, 719; 325/28

[56] References Cited

U.S. PATENT DOCUMENTS

| 2,637,841 | 5/1953 | Davis et al. | 343/112 |
| 2,653,220 | 9/1953 | Bays | 325/28 |
| 2,992,325 | 7/1961 | Lehan | 343/719 |

Primary Examiner—Maynard R. Wilbur
Assistant Examiner—Richard E. Berger
Attorney, Agent, or Firm—R. M. Trepp

EXEMPLARY CLAIM

1. Apparatus for detecting underground nuclear explosions comprising antenna means located in the dielectric substance of a deep waveguide in the earth and adapted to detect low frequency electromagnetic waves generated by a nuclear explosion, said deep waveguide comprising the high conductivity upper sedimentary layers of the earth, the dielectric basement rock, and a high conductivity layer of basement rock due to the increased temperature thereof at great depths, and means for receiving the electromagnetic waves detected by said antenna means.

4 Claims, 3 Drawing Figures

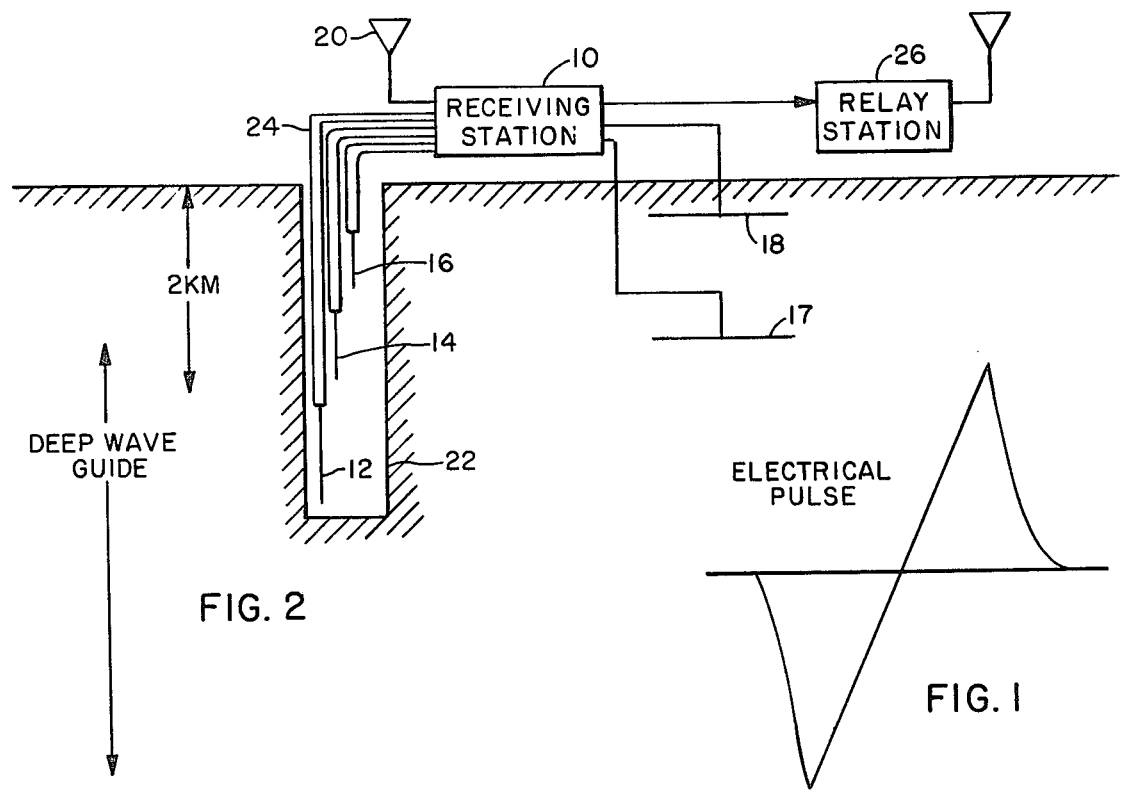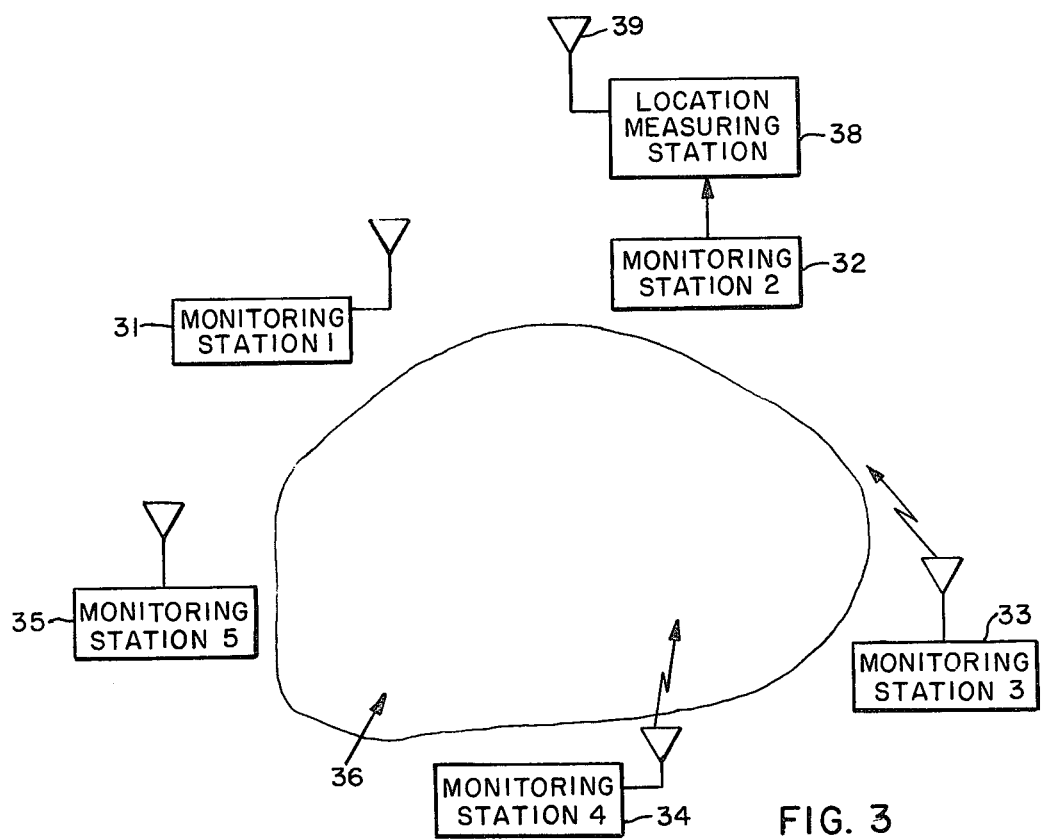

SYSTEM FOR DETECTING NUCLEAR EXPLOSIONS

This invention relates to the detection and location of nuclear explosions and the like.

Several techniques for the detection of nuclear explosions are known, such as the detection of fallout radiation, electromagnetic waves in the atmosphere and seismic waves. Since known techniques may not suffice or may give dubious information under certain circumstances, it is obviously of great importance to provide additional detection and location techniques. This is true, for example, in the case of underground nuclear explosions, with respect to which electromagnetic waves in the atmosphere and radiation fallout detection methods may fail.

It is, accordingly, an object of the present invention to provide an additional technique for the detection and location of nuclear blasts and the like. It is another object of this invention to discover and locate a nuclear blast by detecting and comparing radio waves created thereby.

The present invention is based on the recognition that it is possible to provide radio detection apparatus which will respond to electromagnetic waves created by the nuclear blast, and the recognition that these waves may be propagated over great distances through certain media and particularly through the earth's crust or lithosphere. More particularly, a nuclear blast will create an electrical pulse of great magnitude and sufficiently sharp to produce an electromagnetic wave which will propagate through dielectric media such as the lithosphere. Where suitable dielectric media having sufficiently low loss are present in the earth's surface, the wave thus produced may travel for great distances through the earth. The electromagnetic pulse has very low frequency components of several kilocycles or less. This wave, therefore, can be detected by suitable low frequency antennas and receivers placed in proper media in the earth's surface. A group of such detection stations may be located to monitor a particular area of country. When waves indicative of a nuclear blast are received by the monitoring stations the location of the blast may be determined by comparing the time of arrival of the nuclear blast signals at the several monitoring stations.

The invention will be fully understood from the following description and accompanying drawing wherein:

FIG. 1 shows an electrical pulse which may be produced by a nuclear blast;

FIG. 2 is a schematic view of a monitoring station; and

FIG. 3 is a schematic view of an entire system according to the invention.

A nuclear explosion, in addition to producing the various types of radiation which have been generally discussed in the literature, such as gamma rays and radioactive fallout, also produces an electrical pulse of very great magnitude. This pulse is of the general form shown in FIG. 1; that is, it has a large negative going portion and a positive going portion. The pulse may have frequency components extending from a few cycles per second to far higher frequencies.

Extremely low frequency radio waves such as those produced by a nuclear explosion either above ground or underground will propagate for great distances through the surface of the earth, particularly through basement rock and other low loss layers in the earth. The attenuation of the waves in the earth's surface is relatively low because of their low frequency. It has been determined that propagation of very low frequency waves through favorable layers of the earth is possible for considerable distances. One favorable mode of propagation of radio waves through the earth's surface has been described in the co-pending application of Harold A. Wheeler, Ser. No. 20,100, filed Apr. 5, 1960. In this application, it has been disclosed that a deep wave guide exists in the earth between the upper conductive layer of the earth, which is generally within 1 kilometer of the earth's surface and the high temperature conductive layer at a depth of the order of 20 to 30 kilometers below the earth's surface. A radio wave produced by a nuclear blast may be conducted for great distances through such a deep wave guide. The detection of the radio wave in the deep wave guide is greatly facilitated by the fact that the noise level deep in the earth is almost nil.

Very long waves can also be transmitted through various types or layers of basement rock found in the earth having very low loss characteristics for radio waves. For such very low frequency radio waves, the attenuation even through the more conductive layers of the earth is not very great. Propagation and reception over considerable distances, therefore, is possible.

In view of the above-mentioned facts, a receiving station 10 may be provided with a number of antennas 12, 14, 16, 18 of different depth in the earth. The antenna 12, for example, may extend into the deep wave guide region. Such an antenna may be placed in a deep hole 22, extending several kilometers into the earth. The antenna is preferably located below the conductive layer of the earth, which may extend down perhaps 1 kilometer. The antenna can suitably be, for example, the inner conductor of a coaxial cable 24 extending down to about 2 kilometers. Antennas 14 and 16 may be located at suitable higher levels and locations. Such suitable levels and locations may be places where the earth has large low loss layers, preferably of basement rock extending for great distances into the area to be monitored. A desirable location for a monitoring station would be one where, for example, several basement rock layers exist at different height, and a location where several layers converge and cause a focusing of received waves, would be favorable. Some of the antennas, such as antennas 16 and 18, may be located close to the earth's surface or immediately below the earth's surface. Receiving station 10 is also provided with an above ground antenna system 20 for receiving various frequency components. Antenna 20 can be of the aerial type or even comprise a long wire or wires laid on the surface of the earth. The antennas may be constructed to receive waves having vertical and horizontal polarizations, or generally, different polarization, since the polarization of the received waves may yield additional information as to the character and location of the nuclear explosion. Thus antennas 17 and 18 are adapted to receive horizontally polarized waves. Antenna 17, if used, might be located in a mine, cave, or other deep location of considerable horizontal extent. Both the underground and above ground antennas can be of the magnetic type, such as magnetic dipole type, as well as of the electric type. The antennas are connected to suitable receivers in the receiving station 10, having receivers capable of receiving the various frequency components of the nuclear blast pulse, including those waves in the very low and extremely low frequency ranges, which ranges extend from a few cycles per second up to about 30 kilocycles per second. The receiving station preferably includes apparatus for comparing the various frequency components and polarizations and comparing the received underground radiation with the electromagnetic radiation in the atmosphere, and measuring the relative phases of the various signals to obtain information about the range of the explosion.

In order to determine the location of the nuclear blast, the signals received at receiving station 10 may be compared with signals received at other monitoring stations having known locations, so that by the time differences between the arrivals of the nuclear explosion signal at the several monitoring stations the location and direction of the explosion may be determined. For this purpose the monitoring stations may be provided with a suitable relay station 26 for sending the received signals to a central station.

FIG. 3 shows the general layout of a system which may comprise a plurality of monitoring stations 31-35, each of the type shown in FIG. 2 and including a receiving station as well as a relay station. Each of the monitoring stations may be placed around an area 36, such as a particular country, which is to be monitored. The information from the monitoring stations is transmitted to a central station 38. Where feasible, the information can be transmitted by wire, but generally it would be transmitted by radio relays and received by the receiving antenna 39 of station 38. By comparing the time of arrivals of nuclear created radio signals at the several monitoring stations, the central station 38 may readily determine by simple triangulation methods the direction and location at which a nuclear blast has occurred.

It will be recognized by those skilled in the art that the invention is not limited to the illustrative embodiment herein disclosed and that within the principles of the invention many variations may be made, and, therefore, the invention is not to be construed as limited except as defined in the following claims.

What is claimed is:

1. Apparatus for detecting underground nuclear explosions comprising antenna means located in the dielectric substance of a deep waveguide in the earth and adapted to detect low frequency electromagnetic waves generated by a nuclear explosion, said deep waveguide comprising the high conductivity upper sedimentary layers of the earth, the dielectric basement rock, and a high conductivity layer of basement rock due to the increased temperature thereof at great depths, and means for receiving the electromagnetic waves detected by said antenna means.

2. Apparatus for detecting underground nuclear explosions according to claim 1, including additional antenna means for detecting said electromagnetic waves in close proximity to the earth's surface, whereby the signals received by both of said antenna means may be compared to determine the character and location of said explosion.

3. Apparatus for detecting underground nuclear explosions according to claim 2, wherein one of said antenna means is adapted to receive vertically polarized electromagnetic waves, and the other of said antenna means is adapted to receive horizontally polarized electromagnetic waves.

4. Apparatus for detecting underground nuclear explosions, comprising a plurality of monitoring stations and a central station, each of said monitoring stations including an antenna extending into the basement rock of a deep waveguide in the earth, said waveguide comprising the high conductivity sedimentary layers of the earth, the dielectric basement rock, and the high conductivity basement rock due to the increased temperature at significant depths, and means for transmitting the signals received at said monitoring stations to said central station whereby said signals may be compared to determine the direction and location at which a nuclear explosion occurred.

* * * * *